United States Patent [19]
Dairokuno et al.

[11] Patent Number: 5,845,756
[45] Date of Patent: Dec. 8, 1998

[54] OIL PRESSURE CIRCUIT FOR CLUTCH

[75] Inventors: Satoshi Dairokuno; Masao Shoji; Yasuhito Koike; Mitsuyoshi Suzuki, all of Shizuoka, Japan

[73] Assignee: NSK-Warner Kabushiki Kaisha, Tokyo, Japan

[21] Appl. No.: 758,455

[22] Filed: Nov. 29, 1996

[30] Foreign Application Priority Data

Dec. 1, 1995 [JP] Japan .................................. 7-346613

[51] Int. Cl.[6] .................................................. F16D 25/12
[52] U.S. Cl. .................. 192/85 R; 192/113.3; 192/3.57; 60/486
[58] Field of Search ............................. 192/85 R, 113.3, 192/113.34, 113.35, 3.57, 3.58; 60/429, 456, 486

[56] References Cited

U.S. PATENT DOCUMENTS 4,433,594 2/1984 Smirl ............................. 192/113.34 X
4,515,255 5/1985 Haley et al. ............................ 192/3.57
4,763,487 8/1988 Wicks ..................................... 60/486 X Primary Examiner—Richard M. Lorence
Attorney, Agent, or Firm—Sughrue, Mion, Zinn, Macpeak & Seas, PLLC

[57] ABSTRACT

In addition to a first oil pump directly connected to an engine, a second oil pump is provided which is driven by an electric motor. Accordingly, a start clutch engaging pressure is applied through first and second solenoid-operated valves. The electric motor-driven pump is of the constant pressure type, and therefore its start, at the start of the automobile, can be achieved with a simple control program. After the start of the automobile, the solenoid-operated valve is switched over to the other one, so that the oil pressure is applied from the first oil pump directly connected to the engine, whereby the battery power consumption is minimized. This oil circuit is applied to various kinds of friction engagement clutches.

12 Claims, 5 Drawing Sheets

OIL PRESSURE CIRCUIT FOR CLUTCH

BACKGROUND OF THE INVENTION

1. Field of the Invention

This invention relates to an oil pressure circuit for applying oil pressure to a friction engagement clutch, and particularly relates to a start clutch which is used instead of a torque convertor in an automobile or the like.

2. Description of the Related Art

FIG. 5 shows one example of a conventional oil pressure circuit for a friction engagement clutch, which is a start clutch oil pressure circuit. In FIG. 5, reference numeral 1 designates an engine; 2, a speed change mechanism; 3, a differential gear; 4, tires; 5, 6 and 7, engine power transmission systems; and 10, a start clutch. Oil pressure is applied to the start clutch 10 by an oil pump 21 which is directly connected to the engine and provided in the speed change mechanism 2. Further in FIG. 5, reference numeral 22 designates an oil pool.

Oil discharged from the oil pump 21 is supplied into a pipe 31. A part of the oil thus supplied is caused to flow into the speed change mechanism as indicated by the arrow A, serving as lubricating oil and functioning as operating oil pressure, and another part of the oil is caused to flow into the start clutch 10 as indicated by the arrow B, functioning as clutch engaging oil pressure (in this case, in an solenoid-operated valve 23, its valve body is moved downwardly), and the remaining oil is caused to flow through a throttle member 28, as cooling oil, into the start clutch 10 as indicated by the arrow C. Further in FIG. 5, reference numerals 24, 26 and 27 designate oil pools which are smaller to the aforementioned oil pool 22; and 33, a cooling oil discharge pipe.

When the start clutch 10-is not operated, the solenoid-operated valve 23 is positioned as shown in FIG. 5, so that the oil in the clutch flows into the oil pool 24 as indicated by the arrow D. When a cooling oil relief valve 25 is moved to the right in FIG. 5, the cooling oil is also allowed to flow into the oil pool.

In the conventional start clutch oil pressure circuit, the pump 21 is directly connected to the engine. Therefore, the pressure of oil discharged therefrom depends greatly on the speed of rotation (rpm) of the engine. More specifically, when the engine is in idling state, the discharged oil pressure is low; while, as the speed of rotation of the engine increases, the discharged oil pressure is increased, and it becomes maximum when the speed of rotation of the engine reaches a predetermined value. Thereafter, a relief circuit (not shown) operates so that the discharged oil pressure becomes constant.

The design of the start clutch will now be described. Oil pressure is applied to a cylinder in a clutch pack, and a piston receives the oil pressure to produce a force. The force thus produced is utilized to push friction plates and separator plates to one another, thus accomplishing the engagement of the clutch. The oil pressure applied to the cylinder is controlled by a solenoid-operated valve (or electromagnetic valve). On the other hand, in general, in order to release the clutch, the piston is returned by a return spring.

A description of how an automobile is started follows. First, the oil pressure applied to the cylinder is set low, and then the oil pressure in the cylinder is gradually increased until the clutch is engaged halfway. When the rotation of the engine reaches a certain value, the oil pressure in the cylinder is made maximum, thus completely accomplishing the engagement of the clutch. The transmission torque is adjusted with the start clutch in the above-described manner, to start the automobile.

In order to smoothly start the automobile, it is essential to delicately control the oil pressure applied to the piston. Hence, in the adjustment of the oil pressure, a high-precision solenoid-operated valve must be controlled with a computer. When the clutch is in halfway-engagement at the start of the automobile, the slide friction produces a large amount of heat. Hence, as shown in FIG. 5, another circuit is provided to supply cooling oil to the start clutch.

The speed of rotation of the engine during the period of time that the start clutch is placed in release state, in halfway clutch state, and in complete engagement state, is substantially coincident with the range of speeds of engine rotation in which the discharged oil pressure of the pump is greatly changed. In addition, during this period of time, in order to cool the start clutch, it is necessary to supply a large quantity of cooling oil, and therefore the oil pressure is unstable. As a result, the oil pressure applied to the solenoid-operated valve is greatly changed, and therefore it is difficult to control it with a computer; that is, it is not practical to delicately adjust the oil pressure. Accordingly, it is impossible to smoothly start the automobile; that is, the latter is started jerkily.

SUMMARY OF THE INVENTION

It is an object of the invention is to provide an oil pressure circuit for a friction engagement clutch, particularly a start clutch oil pressure circuit with which the smooth start of the automobile can be achieved without making the program, for controlling the clutch engaging pressure, too intricate.

An oil pressure circuit according to the present invention is comprised of: a first oil supply unit having an engine as a drive source; and a second oil supply unit having a driving source other than the engine; such that the first oil supply unit and the second oil supply unit have independent driving sources.

An oil pressure circuit for a start clutch according to the present invention includes a first oil pump which supplies oil pressure to a speed change mechanism, and directly connected to an engine; and a second oil pump which supplies oil pressure to the start clutch; wherein the first and the second oil pump are independently operated.

In the start clutch oil pressure circuit of the present invention, in addition to an oil pump directly connected to the engine, a motor-operated oil pump is provided to provide a constant oil pressure. Hence, the start of the automobile can be achieved with a relatively simple program.

PREFERRED EMBODIMENTS OF THE INVENTION

First Embodiment

Figure 1:
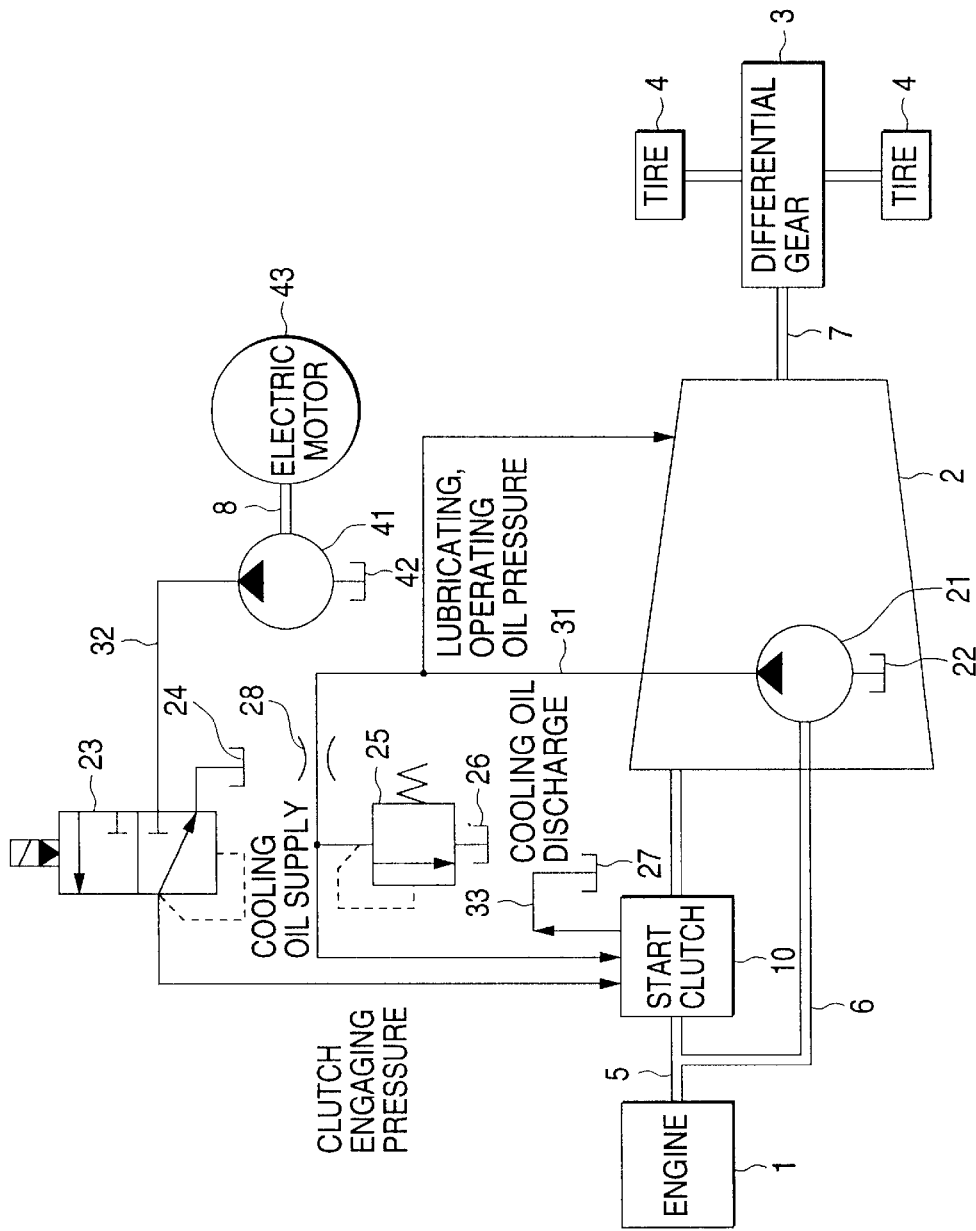
FIG. 1 is an explanatory diagram showing an example of a start clutch oil pressure circuit, which constitutes a first embodiment of the invention.
Figure 5:
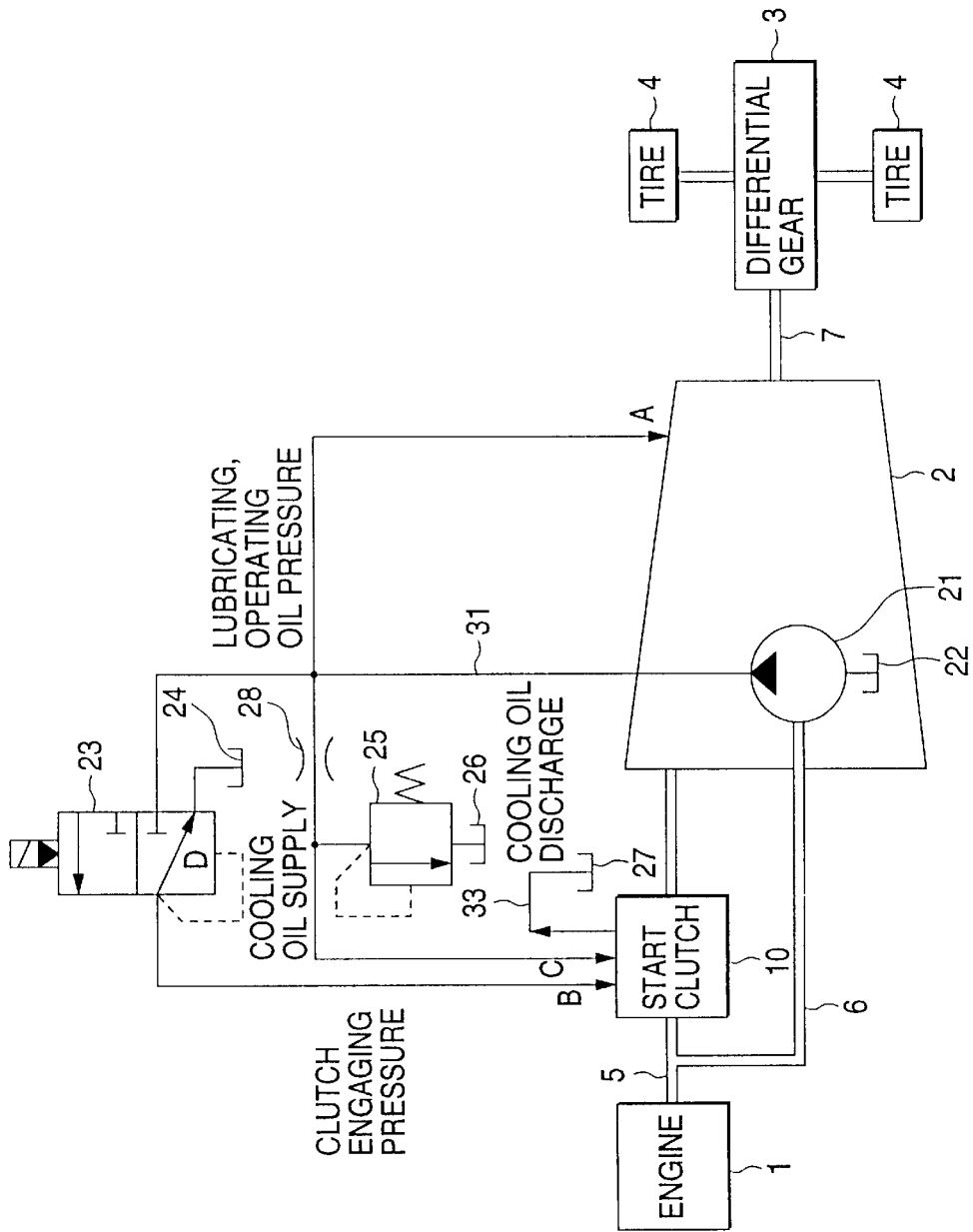
FIG. 5 is an explanatory diagram showing a conventional start clutch oil pressure circuit.

FIG. 1 shows an oil pressure circuit for a friction engagement clutch, which constitutes a first embodiment of the invention, in which parts corresponding functionally to those described with reference to FIG. 5 are designated by the same reference numerals or characters.

In the first embodiment, in addition to the system of a first oil pump 21 directly connected to the engine, another system is provided; that is, a second oil pump 41 driven by an electric motor 43 is provided to apply clutch engaging pressure through a pipe 32 and a solenoid-operated valve 23 to a start clutch. Generally, the solenoid-operated valve 23 is a proportional valve in which a duty valve serves as a pilot valve. The solenoid-operated valve is controlled by a control system (not shown). The above-described precise control of the oil pressure makes it possible to smoothly start the automobile. The oil pressure is applied to the solenoid-operated valve 23 by the second oil pump 41 driven by the electric motor 43, and controlled for constant pressure with a relief valve (not shown). In FIG. 1, reference numeral 8 designates a power transmission system between the motor and the pump.

The electric motor 43 is driven by the power of a battery (not shown), which is charged by an AC generator (not shown). In order to prevent the discharge of the battery, a diode may be interposed between the AC generator and the battery, if necessary. In FIG. 1, reference numeral 42 designates an oil pool which is the same as the oil pool 22.

The oil pressure applied to the solenoid-operated valve 23 is of constant pressure and is provided by the second oil pump 41 driven by the electric motor 43. The oil pressure provided by pump 41 is independent of the speed of rotation of the engine. Hence, the smooth start characteristic of the automobile is obtained merely by controlling the solenoid-operated valve 23 according to a relatively simple program. The other operations are the same as those of the start clutch oil pressure circuit shown in FIG. 5.

Second Embodiment

Figure 2:
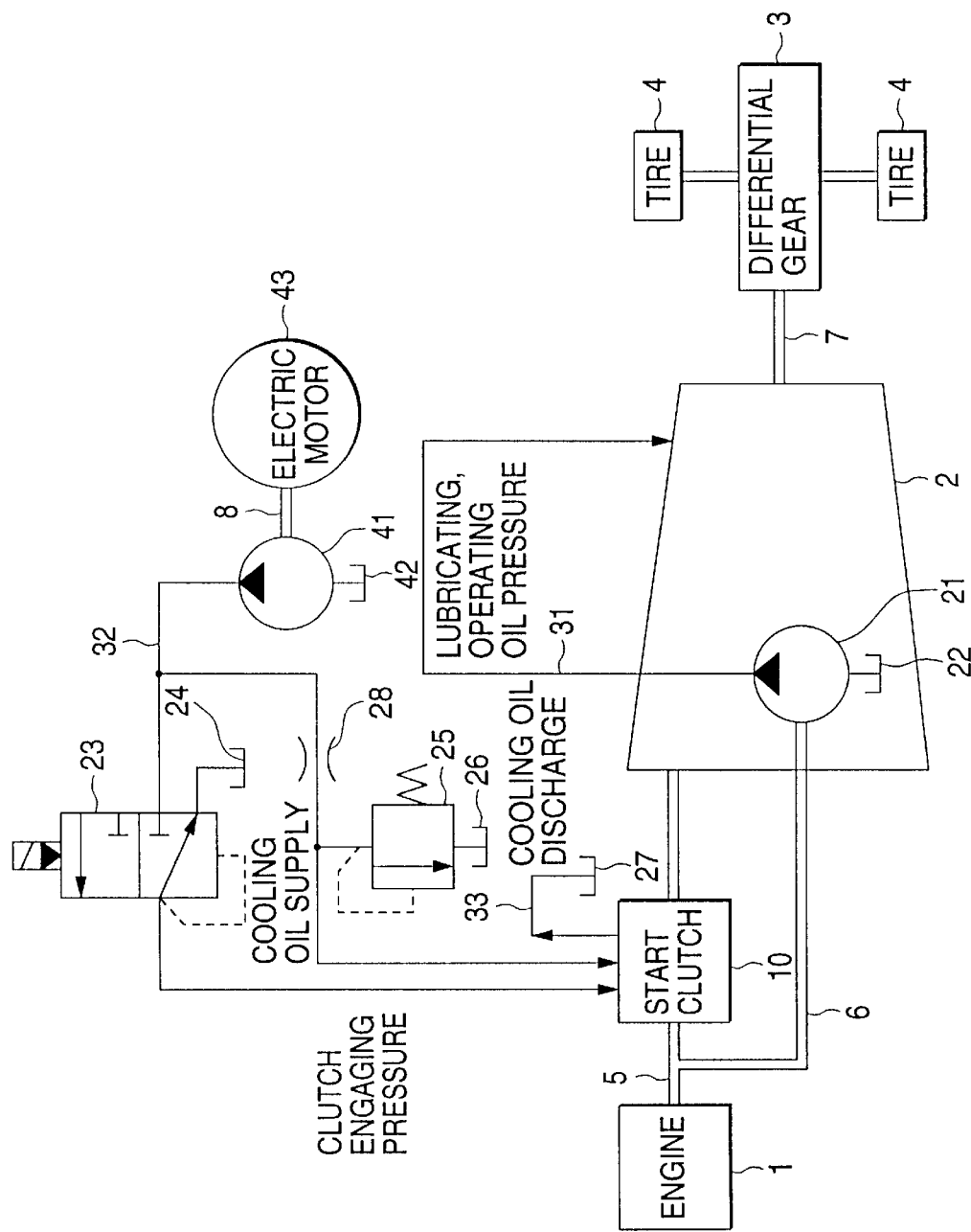
FIG. 2 is an explanatory diagram showing a second embodiment of the start clutch oil pressure circuit.

FIG. 2 shows a second embodiment of the start clutch oil pressure circuit, in which parts corresponding functionally to those described with reference to FIGS. 1 and 5 are designated by the same reference numerals or characters.

In the first embodiment shown in FIG. 1, the second oil pump 41 driven by the electric motor 43 applies the clutch engaging pressure to the start clutch 10, whereas the first oil pump 21 directly connected to the engine applies the cooling oil to the start clutch. However, in the second embodiment, a circuit is formed as that the second oil pump 41 applies the clutch engaging pressure and the cooling oil to the start clutch, and the circuit thus formed is completely separated from a circuit through which the first oil pump applies lubricating oil and operating oil pressure to the speed change mechanism. In this point, the second embodiment is different from the-first embodiment.

Third Embodiment

Figure 3:
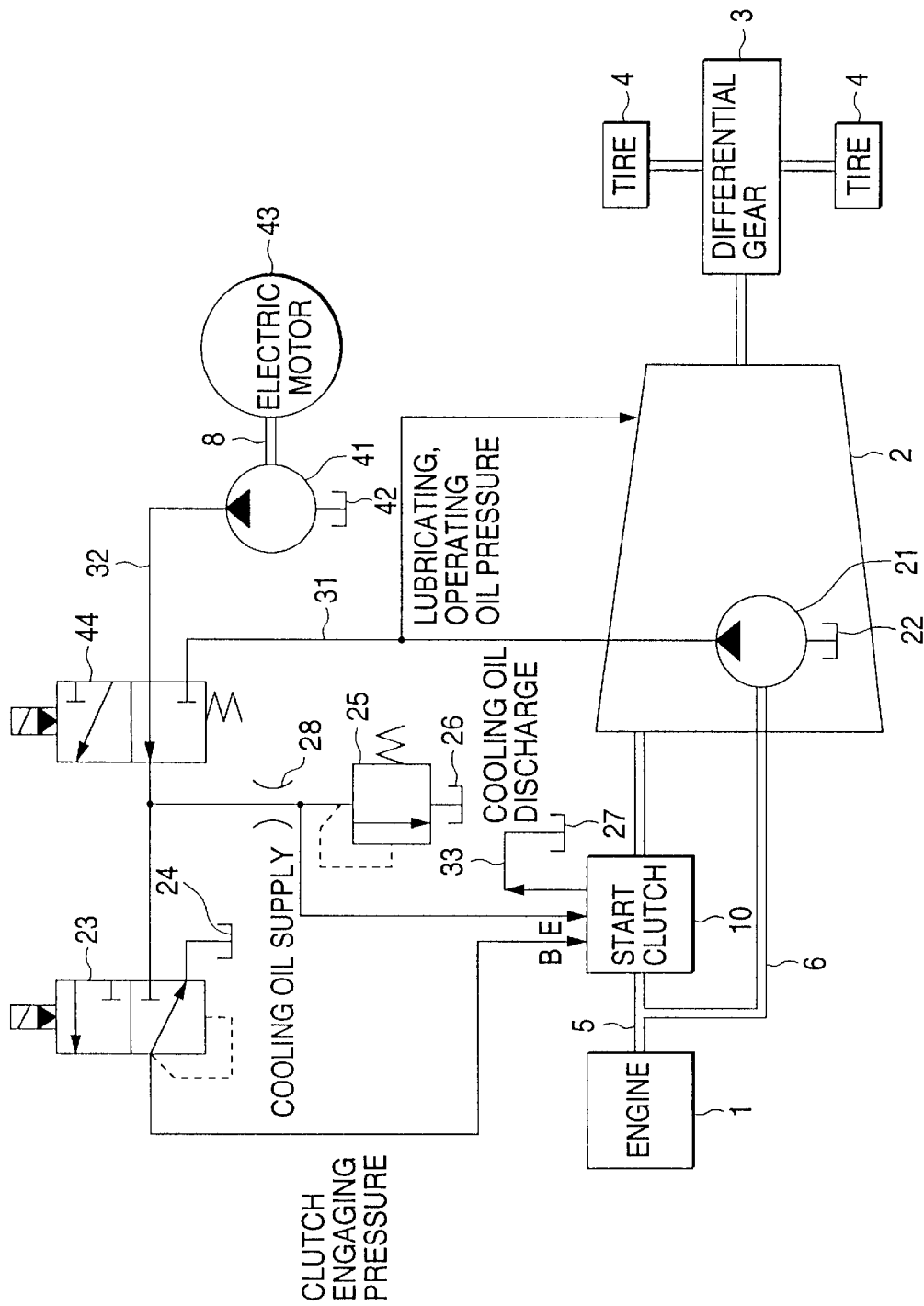
FIG. 3 is an explanatory diagram showing a third embodiment of the start clutch oil pressure circuit.

FIG. 3 shows a third embodiment of the start clutch oil pressure circuit, in which parts corresponding functionally to those described with reference to FIGS. 1, 2 and 5 are designated by the same reference numerals or characters.

In the third embodiment, the second oil pump 41 applies oil pressure to a second solenoid-operated valve 44, and applies a clutch engaging pressure to the start clutch 10 through a first solenoid-operated valve 23 connected in series to the second solenoid-operated valve 44. The cooling oil is supplied from the connecting point of the first and second solenoid-operated valves 23 and 44 to the start clutch. In addition, the oil pressure provided by the first oil pump is also supplied to the second solenoid-operated valve 44.

In starting the automobile, the valve body of the second solenoid-operated valve 44 is positioned as shown in FIG. 3, while the valve body of the first solenoid-operated valve 23 is moved downwardly in FIG. 3, so that the second oil pump 41 applies the clutch engaging pressure through the second solenoid-operated valve 44 and the first solenoid-operated valve 23 to the start clutch 10 as indicated by the arrow B. In this operation, the first oil pump 21 directly connected to the engine applies lubricating oil and operating oil pressure to the speed change mechanism.

The smooth starting of the automobile is realized by controlling the first solenoid-operated valve 23 with a control system (not shown). The cooling oil of the start clutch is supplied through the second solenoid-operated valve 44; however, it may be supplied from the first oil pump 21.

When the automobile, after being started, is traveling, the second solenoid-operated valve 44 is operated; that is, its valve body is moved downwardly, the supply of the oil from the second oil pump is suspended, and the oil pressure provided by the first oil pump 21 is applied through the first solenoid-operated valve 23 and the second solenoid-operated valve 44, as clutch engaging pressure and cooling oil, to the start clutch 10 as indicated by the arrows B and E, respectively. In this operation, the speed of rotation of the engine has been sufficiently high, and accordingly the output pressure of the first oil pump 21 is also sufficiently high. The output oil pressure of the first oil pump, after being adjusted by a pressure adjusting circuit (not shown) in the speed change mechanism, is applied to the start clutch, so as to maintain the engagement of the latter. Since the electric motor is stopped, power consumption can be minimized.

In the case where the speed change mechanism is of the type that the engagement of gears is changed to change the speed, the second solenoid-operated during the speed change valve 44 may be operated; that is, its valve body may be moved to supply the oil from the second oil pump 41 to the first solenoid-operated valve 23, so that the latter 23 changes the clutch engaging pressure and thereby absorbs the shock attributed to the change of speed.

Modification of Third Embodiment

Figure 4:
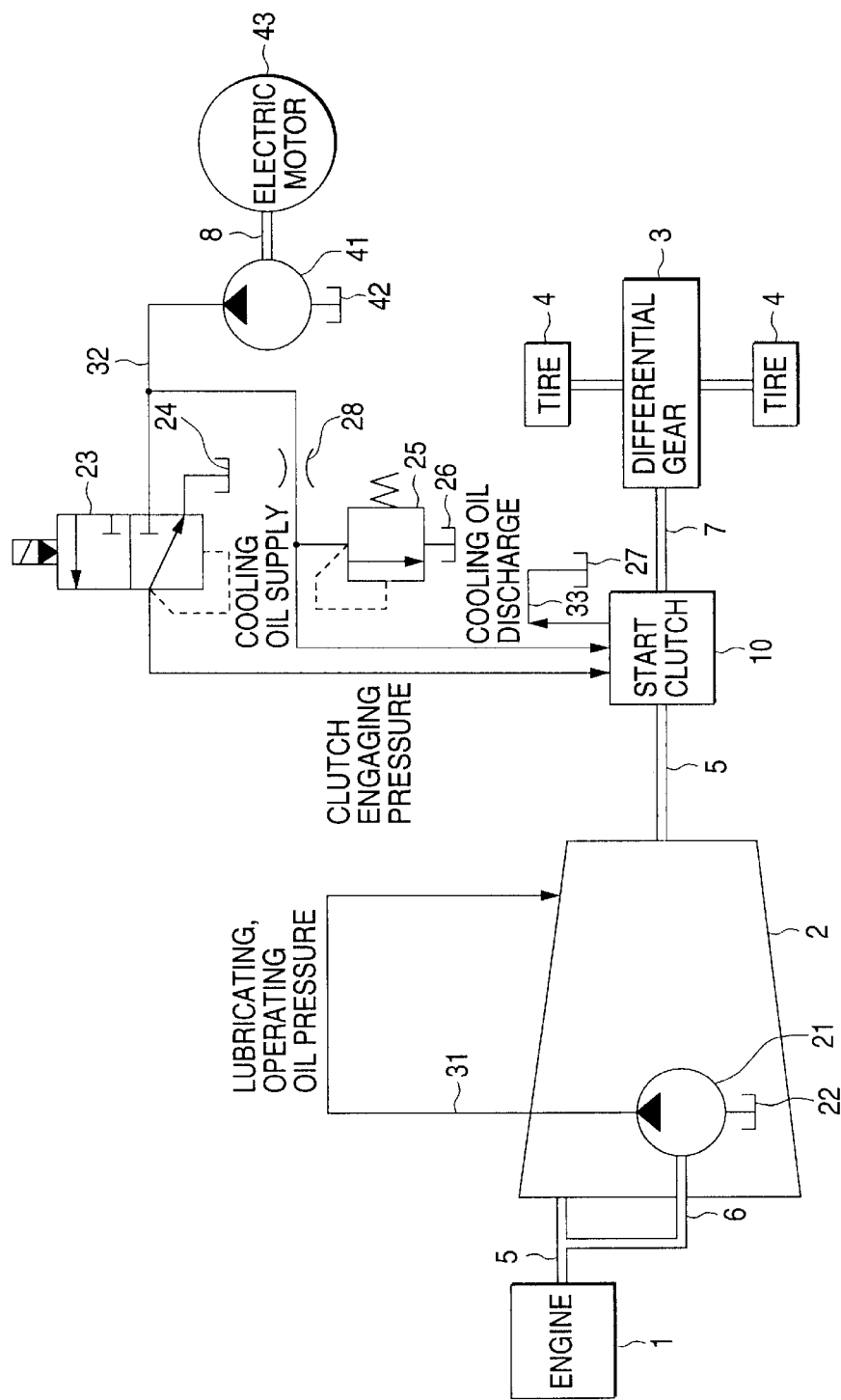
FIG. 4 is an explanatory diagram showing a modification of the second embodiment.

FIG. 4 shows an application of the oil pressure circuit of, the second embodiment, in which parts corresponding functionally to those described with reference to FIG. 2 are therefore designated by the same reference numerals or characters. However, it should be noted that oil pools 24, 26, 27 and 42 are the same, but they are different from an oil pool 22. In this modification, the speed change mechanism 2 is provided between the engine 1 and the start clutch 10.

The speed change mechanism 2 forms a half-independent circuit of the circuit formed by the start clutch section; i.e., the start clutch 10, the second oil pump 41, and the electric motor 43, and the speed change mechanism 2. Hence, those oil pressure circuits can be installed at different parts of the automobile. Especially, in the case of the second embodiment shown in FIG. 2, the start clutch and the speed change mechanism are oil pressure circuits which are completely independent of each other, and therefore as shown in FIG. 4 illustrating the application of the second embodiment, the start circuit may be relatively freely arranged, for instance, near the differential gear.

In the present invention, the start clutch may be released by using the oil pressure circuit instead of the return spring.

In this case, for the pressure of releasing the start clutch, the oil pressure circuit of the invention may be employed.

In the start clutch oil pressure circuit thus designed, in addition to the oil pump directly connected to the engine, the motor-operated oil pump is provided to provide a constant oil pressure. Hence, the start of the automobile can be achieved with a relatively simple program.

The motor-operated oil pump is used only at the start of the automobile. During the ordinary traveling of the automobile, the oil pressure is switched over to that of the oil pump directly connected to the engine. Hence, battery power consumption is minimized.

The oil circuit according to the present invention is not only applied to the start clutch but also applied to various kinds of the oil pressure circuits of the friction engagement clutch.

What is claimed is:

1. An oil pressure circuit for a start clutch, comprising:

first oil pressure supplying means for supplying oil pressure to a speed change mechanism, said first oil pressure supplying means is driven by an engine; and second oil pressure supplying means, connected to a start clutch, for supplying oil pressure to said start clutch;

wherein said first oil pressure supplying means and said second oil pressure supplying means are driven independently of one another.

2. An oil pressure circuit for a start clutch as claimed in claim 1, wherein said first oil pressure supplying means is connected to said start clutch for supplying oil pressure to said start clutch.

3. An oil pressure circuit for a start clutch as claimed in claim 2, further comprising:

switching means for switching the source of oil pressure, applied to said start clutch, between said first oil pressure supplying means and said second oil pressure supplying means.

4. An oil pressure circuit for a start clutch as claimed in claim 1, further comprising a speed change mechanism, wherein an oil pressure circuit of the start clutch and an oil pressure circuit of the speed change mechanism include oil pools which are independent of each other.

5. An oil pressure circuit according to claim 4, wherein said oil pressure circuit connected to said start clutch includes means for maintaining oil in said start clutch oil pressure circuit separate from oil in all other oil pressure circuits.

6. An oil pressure circuit comprising:

first oil supply means, connected to an engine driving source, for supplying oil to a gear change mechanism;

second oil supply means, connected to a driving source other than the engine, for supplying oil to the gear change mechanism;

wherein said driving sources of said first oil supply means and said second oil supply means are independent driving sources.

7. An oil pressure circuit according to claim 6, wherein said first oil supply means is connected to a friction engagement clutch for supplying oil pressure to said friction engagement clutch.

8. An oil pressure circuit according to claim 7, wherein said second oil supply means is connected to said friction engagement clutch for supplying oil pressure to said friction engagement clutch, and further comprising:

switching means for switching the source of pressure, applied to said friction engagement clutch, between said first oil pressure supplying means and said second oil pressure supplying means.

9. An oil pressure circuit according to claim 7, wherein an oil pressure circuit connected to said friction engagement clutch is completely independent of all other oil pressure circuits.

10. An oil pressure circuit according to claim 9, wherein said oil pressure circuit connected to said friction engagement clutch includes means for maintaining oil in said friction engagement clutch oil pressure circuit separate from oil in all other oil pressure circuits.

11. An oil pressure circuit according to claim 6, wherein the driving source of said second oil pressure supplying means is an electric motor.

12. An oil pressure circuit according to claim 6, wherein said first and second oil supply means are connected to a frictional engaging clutch for supplying oil pressure to said frictional engaging clutch.

* * * * *